(12) United States Patent
Nomura et al.

(10) Patent No.: US 8,262,903 B2
(45) Date of Patent: Sep. 11, 2012

(54) PROCESS, REACTOR AND FACILITY FOR THERMALLY CRACKING HEAVY PETROLEUM OIL

(75) Inventors: Makoto Nomura, Yokohama (JP);
Kenichi Mimura, Yokohama (JP);
Munenori Maekawa, Yokohama (JP);
Naoko Suzuki, Yokohama (JP);
Katsunori Yagi, Sodegaura (JP)

(73) Assignees: Chiyoda Corporation, Yokohama-Shi (JP); Fuji Oil Co., Ltd., Sodegaura-Shi (JP)

( * ) Notice: Subject to any disclaimer, the term of this patent is extended or adjusted under 35 U.S.C. 154(b) by 804 days.

(21) Appl. No.: 12/440,424

(22) PCT Filed: Sep. 27, 2007

(86) PCT No.: PCT/JP2007/068853
§ 371 (c)(1),
(2), (4) Date: Mar. 30, 2009

(87) PCT Pub. No.: WO2008/038731
PCT Pub. Date: Apr. 3, 2008

(65) Prior Publication Data
US 2010/0000909 A1    Jan. 7, 2010

(30) Foreign Application Priority Data

Sep. 28, 2006  (JP) ................. 2006-264139

(51) Int. Cl.
*C10G 9/36*  (2006.01)
*B01J 10/00*  (2006.01)
(52) U.S. Cl. ....................... 208/130; 422/129
(58) Field of Classification Search .......... 208/130; 422/129
See application file for complete search history.

(56) References Cited

U.S. PATENT DOCUMENTS

| 2,942,043 | A | * | 6/1960 | Rummert | 208/128 |
| 3,855,339 | A | * | 12/1974 | Hosoi et al. | 208/130 |
| 4,085,034 | A | | 4/1978 | Endo et al. | |
| 4,214,979 | A | | 7/1980 | Nakanishi et al. | |
| 4,349,432 | A | * | 9/1982 | Rowe et al. | 208/130 |

FOREIGN PATENT DOCUMENTS

| CA | 1209943 | 8/1966 |
| GB | 1557809 | 12/1979 |
| GB | 2 133 034 A | 7/1984 |
| JP | 52-47007 A2 | 4/1977 |
| JP | 63-38076 B2 | 7/1988 |
| JP | 07-116450 A | 5/1995 |

OTHER PUBLICATIONS

English-language abstract of JP-59-109590-A which corresponds to JP-63-38076-B2.

* cited by examiner

*Primary Examiner* — Randy Boyer
(74) *Attorney, Agent, or Firm* — Birch, Stewart, Kolasch & Birch, LLP

(57) ABSTRACT

The suppression of coke adherence in a reaction vessel and cracked gas pipelines at the outlet of the reaction vessel and the prevention of plugging are designed by improving the dispersion of superheated steam inside the reaction vessel to preferable conditions, and pitch having more uniform and higher quality can be produced.

A cracking process in which superheated steam is directly contacted with the heavy petroleum oil by blowing the superheated steam into the reaction vessel to be thermally cracked to oil fractions and pitch, wherein the superheated steam is blown into the reaction vessel from the bottom portion thereof so that the superheated steam generates rotational flow around the central axis of the shell of the reaction vessel.

3 Claims, 9 Drawing Sheets

PROCESS, REACTOR AND FACILITY FOR THERMALLY CRACKING HEAVY PETROLEUM OIL

TECHNICAL FIELD

The invention relates to a thermal cracking process for heavy petroleum oil and a thermal cracking reaction vessel (reactor) used for the process, and a thermal cracking facility equipped with the thermal cracking reaction vessel.

BACKGROUND ART

Heavy petroleum oil and residual oil having a high content of sulfur such as petroleum asphalt are less valuable because of serious impact on the environment when directly burnt as fuel. Consequently, such heavy petroleum oil (including residual oil; hereinafter the same) is cracked and converted into lighter fractions to be used as various kinds of useful industrial raw materials. As one of such methodologies, the following thermal cracking process is mentioned.

As a process for thermal cracking of heavy petroleum oil, there is a proposed process in which a thermal cracking facility is provided with a cracking furnace and a reaction vessel and the heavy petroleum oil heated in the cracking furnace is introduced into the reaction vessel to be thermally cracked (refer to Patent Document 1). In the thermal cracking process, the heavy petroleum oil is introduced into the reaction vessel after being heated to the higher temperature than 450° C. in the cracking furnace so that the conversion rate of cracking reaction reaches 30 to 45%. The heavy petroleum oil fed into the reaction vessel is directly contacted with superheated steam of 500 to 700° C. that is blown in from the bottom of the reaction vessel and thermally cracked to produce gaseous cracked substances as cracked product. The cracked product obtained by this process is gaseous cracked substances rich in aliphatic hydrocarbons as a main product and petroleum pitch rich in poly-aromatics as a by-product. The gaseous cracked substances produced are discharged together with steam from the upper discharge outlet of the reaction vessel and introduced into the distillation tower provided for distillation separation of them.

FIG. 14 shows the schematic perspective view of a reaction vessel 106 provided for a conventional thermal cracking process for heavy petroleum oil. As shown in FIG. 14, the reaction vessel 106 comprises a main body portion (or a shell) 116 having a vertical cylindrical shape and a bottom portion (or a tapered bottom) having a tapered shape where is provided with blowing nozzles 114 connected to the inside of the reaction vessel 106. Superheated steam is blown into the inside of the reaction vessel 106 from the blowing nozzles 114 under the condition that the reaction vessel is filled with heavy petroleum oil. The role of the superheated steam blown in from the bottom of the reaction vessel is the heating of heavy petroleum oil and the rapid discharge of cracked products.

In a conventional thermal cracking process of heavy petroleum oil, superheated steam is blown in through the blowing nozzles 114 to the slightly upward direction (the direction C' as shown by arrows) against the central axis (dashed line S' as shown in the drawing) of the shell 116 of the reaction vessel 106 and it generates great driving force to the direction E as shown by the arrow. However, preferable uniform dispersion of superheated steam can not be realized since this behavior of the superheated steam causes blow-through to the center of the reaction vessel 106 and partially stagnant portion of heavy petroleum oil inside of the reaction vessel 106. When uniform dispersion of superheated steam is not realized, it causes remarkable degradation of pitch quality due to higher content of quinoline-insoluble component as well as increased coking tendency due to uneven heating and delay in the discharge of the cracked products. Further, there is severe entrainment of pitch caused by blow-through and the adherence of coke inside the downstream cracked gas piping is likely to be occurred, and it may cause plugging of piping.

[Patent Document 1] JP07-116450 B (1995)
[Patent Document 2] JP54-15444 B (1979)
[Patent Document 3] JP57-15795 B (1982)
[Patent Document 4] JP63-38076 B (1988)

DISCLOSURE OF THE INVENTION

Problems to be Solved by the Invention

Consequently, it is the object of the invention to provide a thermal cracking process of heavy petroleum oil realizing less coke adherence on the inside wall of the reaction vessel and the cracked gas piping connected to the reaction vessel, prevention against plugging and more uniform and higher quality pitch production by improving the conventional blowing-in technologies of superheated steam to the reaction vessel in order to achieve uniform dispersion of steam inside the reaction vessel, thermal cracking reaction vessel used for the process and a thermal cracking process equipped with the thermal cracking reaction vessel.

Means for Solving Problems

The above-mentioned object is attained by the invention below. Namely, a process for thermal cracking of heavy petroleum oil of the invention (hereinafter, often referred merely to as the "thermal cracking process of the invention") is a process for thermal cracking of heavy petroleum oil in which the heavy petroleum oil is introduced into a reaction vessel of which at least a shell has a vertical cylindrical shape after being heated-up to a higher temperature than 450° C. in a cracking furnace, and superheated steam of 400 to 700° C. is blown into the reaction vessel from the bottom portion thereof and is directly contacted with the heavy petroleum oil to be thermally cracked to oil fractions and pitch, wherein the superheated steam is blown into the reaction vessel from the bottom portion thereof so that the superheated steam generates rotational flow around the central axis of the shell inside of the reaction vessel.

According to the thermal cracking process of the invention, stirring effect by the rotational flow is produced by blowing the superheated steam so that the superheated steam generates the rotational flow around the central axis of the shell inside of the reaction vessel, and the dispersion of the superheated steam into the reaction vessel is improved thereby. Consequently, since the rapid discharge of cracked products and the promotion of cracking reaction of the heavy petroleum oil are attained, pitch having higher and more uniform quality can be produced.

Since the superheated steam is dispersed uniformly inside of the reaction vessel, the blow-through of the superheated steam is not occurred, rapid discharge of cracked product is attained, entrainment of pitch is decreased and coke adherence on the inside wall of the reaction vessel and/or the cracked gas piping connected to the reaction vessel is improved, and consequently plugging of the piping can be prevented.

In the present invention, the blowing of the superheated steam into the reaction vessel from the bottom portion thereof is carried out through one or more of blowing nozzles which are provided to the bottom portion of the reaction vessel that are opened to the inside of the reaction vessel through the blowing orifices, and a direction of the superheated steam blowing through the nozzles is directed to be perpendicular to the axis of the shell of the reaction vessel, parallel to or upward against a plane including the blowing orifices (or the blowing nozzles) and also along a direction where a facing angle θ between the outer wall of the reaction vessel and the normal line on the plane comes within the range of 0° to 90°.

The direction of the blowing-into of the superheated steam can be adjusted by slanting the angle to the appropriate direction so that the rotational flow of the superheated steam can be generated around the central axis of the shell of the reaction vessel. At this time, the preferable angle θ is within the range of 20° to 60°.

Further, the thermal cracking reaction vessel of the heavy petroleum oil of the present invention (hereinafter, occasionally referred merely to as the "thermal cracking reaction vessel of the invention" or the "reaction vessel of the invention"), in which the heavy petroleum oil is introduced into a reaction vessel of which at least a shell has a vertical cylindrical shape after being heated-up to a higher temperature than 450° C. in a cracking furnace, and superheated steam of 400 to 700° C. is blown into the reaction vessel from the bottom portion thereof and is directly contacted with the heavy petroleum oil to be thermally cracked to oil fractions and pitch, is characterized in that a blowing means for blowing the superheated steam into the reaction vessel from the bottom portion thereof (preferably, the bottom portion is a tapered bottom) is provided and the blowing means allows the superheated steam to generate rotational flow around the central axis of the shell in the reaction vessel.

According to the thermal cracking reaction vessel of the invention, since the above-mentioned blowing means is provided, the superheated steam produces the rotational flow around the central axis of the shell of the reaction vessel, stirring effect is remarkably produced and the dispersion of the superheated steam in the reaction vessel is improved. Consequently, the rapid discharge of cracked products and the promotion of cracking reaction of the heavy petroleum oil are attained, and pitch having more uniform and higher quality can be produced. Further, since the superheated steam is dispersed uniformly in the reaction vessel, entrainment of pitch is decreased, coke adherence on the inside wall of the reaction vessel and/or the cracked gas piping connected to the outlet of the reaction vessel is improved, and consequently plugging of the piping can be prevented.

The blowing means can be a means for blowing the superheated steam into the reaction vessel through the blowing orifices from one or more of pipe-like blowing nozzles provided to the tapered bottom of the reaction vessel, and at this time, a direction of the blowing nozzles is directed to be perpendicular to the axis of the shell of the reaction vessel, parallel to or upward against a plane including the blowing nozzles and also along a direction where a facing angle θ between the outer wall of the reaction vessel and the normal line on the plane comes within the range of 0° to 90°, preferably within the range of 20° to 60°.

The direction of the blowing-into of the superheated steam can be adjusted by slanting the angle to the appropriate direction so that the rotational flow can be generated around the central axis of the shell of the reaction vessel.

On the other hand, the thermal cracking facility of heavy petroleum oil of the invention (hereinafter, occasionally called merely as the "thermal cracking facility of the invention"), in which the heavy petroleum oil heated by the cracking furnace is introduced into the reaction vessel, superheated steam of 400 to 700° C. is blown into the reaction vessel from a bottom portion thereof, and the superheated steam is directly contacted with the heavy petroleum oil to be thermally cracked to oil fractions and pitch, is characterized in that the reaction vessel is the thermal cracking reaction vessel of the invention as above-mentioned.

Effect of the Invention

According to the process for thermal cracking of heavy petroleum oil and the thermal cracking reaction vessel, and the thermal cracking facility of the invention, since it is a constitution in which the superheated steam is blown into by the rotational flow from the bottom portion of the reaction vessel, the superheated steam is uniformly dispersed in the reaction vessel, and consequently, the rapid discharge of cracked products is attained and the cracking reaction of the heavy petroleum oil is promoted. Accordingly, the suppression of coke adherence and plugging in the reaction vessel and/or the cracked gas piping connected to the outlet of the reaction vessel, and the production of pitch having more uniform and higher quality can be realized.

EXPLANATION OF NUMERALS

Figure 1:
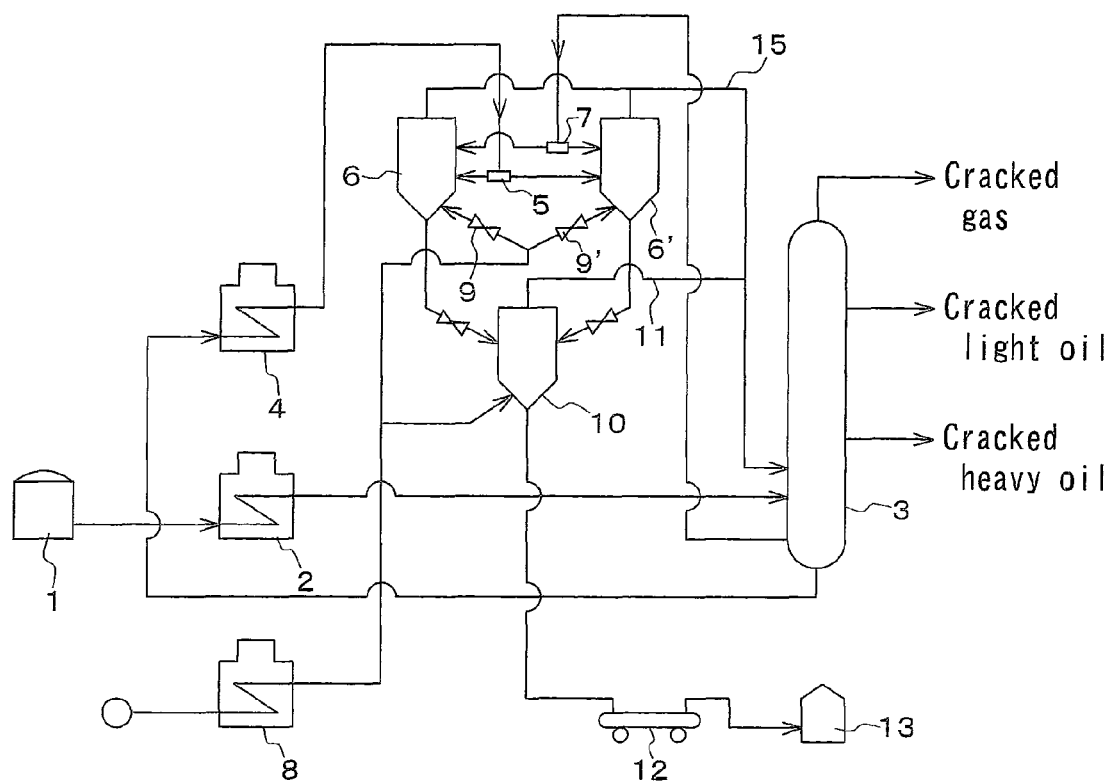
FIG. 1 is a flow sheet to illustrate the whole composition of the thermal cracking process of the heavy petroleum oil and the thermal cracking facility for the heavy petroleum oil according to the present invention.

1: Raw material tank
2: Raw material preheating furnace
3: Distillation tower
4: Tubular cracking furnace (heating furnace)
5, 7: Switching valve
6, 6': Reaction vessel (thermal cracking reaction vessel)
8: Steam super-heater
9, 9': Valve
10: Liquid pitch storage tank
11, 15: Line
12: Pitch solidification facility
13: Product pitch storage facility
14a, 14b, 114: Blowing nozzles
16, 116: Shell of the reaction vessel
18a, 18b: Blowing orifices

BEST MODES FOR CARRYING OUT THE INVENTION

The details of the invention are illustrated below according to the drawings. At first, the whole flow scheme is illustrated with respect to the thermal cracking process and the thermal cracking facility of the heavy petroleum oil of the invention. Then, the under-mentioned details of the constitution of the thermal cracking reaction vessel specific to the invention are merely illustrated.

FIG. 1 is a flow sheet for illustrating the whole composition of the process for thermal cracking of heavy petroleum oil and the thermal cracking facility of the invention. Raw feed-stock (heavy petroleum oil) is sent from the raw material tank 1 is charged into the distillation tower 3 after pre-heated up to about 350° C. by the raw material preheating furnace 2. The preheated raw feed charged to the lower section of the distillation tower is mixed with the cracked heavy oil which is fallen down to the bottom as recycle oil. The ratio (recycle oil/raw feed) of the recycle oil to the raw feed is within the range of 0.05 to 0.25, and preferably within the range of 0.10 to 0.20.

The raw feed oil mixed with the recycle oil is fed to the tubular cracking furnace (heating furnace) 4. The mixed feed oil is heated-up to the temperature of 480 to 500° C., preferably 490 to 500° C. in the tubular cracking furnace 4 to be thermally cracked. Outlet pressure of the tubular cracking furnace 4 is within the range from atmospheric pressure to about 0.4 MPa and the reaction time is normally 0.5 to 10 minutes, preferably 2 to 5 minutes.

The thermal cracked products (heavy petroleum oil) of high temperature obtained in the tubular cracking furnace 4 are introduced into predetermined reaction vessels (thermal cracking reaction vessels) 6 and 6' via switching valve 5 while being flashed, but it is preferable that the raw feed oil is preliminarily fed partially from the bottom of the distillation tower 3 via the switching valve 7 prior to the introduction through the cracking furnace (preliminary feeding). The quantity of the preliminary feeding is 5 to 18% by volume of the total feeding quantity of reaction vessels 6 and 6' and preferably 10 to 15% by volume. Further, the temperature of the raw feed oil for the preliminary feeding is about 340° C. Each of the switching valves 5 and 7 is actuated with their constant interval and the raw feed oils for the preliminary feeding and the thermal cracked products from the tubular cracking furnace 4 are respectively and periodically charged up alternately to the couple of reaction vessels 6 and 6'. By this periodical operation, thermal cracking reaction of the thermal cracked products continuously fed from the tubular cracking furnace 4 is carried out continuously in the reaction vessels.

Each of the reaction vessel 6 and 6' is a container comprising a shell having a vertical cylindrical shape and a tapered bottom having a tapered shape (a shape in which the shell diameter is gradually narrowed with the longitudinal length toward the bottom) and is provided with a raw feed inlet, a heat medium gas inlet, outlets of cracked gas, cracked oil and heat medium gas, and a taking-out nozzle of residual products. Further, a mixer can be provided if necessary.

After the superheated steam as heat medium gas is heated by a steam super-heater 8 to 400 to 700° C., it is blown into the reaction vessels 6 and 6' through the valves 9 and 9'.

When the thermal cracked products from the tubular cracking furnace 4 are fed into the reaction vessels 6 and 6', the temperature of the preliminary fed material in the reaction vessels 6 and 6' is about 340° C. just before feeding through the cracking furnace. The temperature in the reaction vessels is raised to 430 to 440° C. as the feeding through the cracking furnace proceeds, and cracking reaction and polymerization-condensation reaction of the thermal cracked products introduced in the reaction vessels are further promoted.

It is preferable to set the time for one batch of feeding to be 50 to 120 minutes, more preferably to be 60 to 90 minutes. The softening point of the residual product in the reaction vessels (hereinafter, often called merely as the "pitch") is raised at completion of the feeding. The reactions are further proceeded by continuing blowing-into of superheated steam even after completion of the feeding. It is preferable to determine the reaction time after the feeding to be 15% to 45% of the feeding time, more preferably to be 25% to 45%.

Since the thermal cracked products from the tubular cracking furnace are fairly exposed to thermal cracking reaction and also the temperature is high enough, whereas the reaction time (retention time) after the feeding is hardly required, extended feeding time for the reaction vessels 6 and 6' is likely to make pitch product less homogeneous. Accordingly, the feeding time is limited to be within the rage of 50 to 120 minutes in order to obtain homogeneous pitch, and blowing-into of the superheated steam after completion of the feeding is continued for the period of 15 to 45% of the feeding time to keep thermal cracking process continued.

Since the temperature of the superheated steam fed to the reaction vessels 6 and 6' is 400 to 700° C., it is resulted in to use steam of relatively low temperature. Further, required quantity of the superheated steam is comparatively small as it is 0.08 to 0.15 kg per 1 kg of the total feed quantity of the raw feed oil for the reaction vessels 6 and 6'.

The gaseous cracked substances and steam contained in the thermal cracked products are discharged from the top outlet of the reaction vessels 6 and 6' and are fed to the distillation tower 3 during the feeding of the thermal cracked products from the tubular cracking furnace 4 and during the reaction process succeeded.

After completion of the reaction in the reaction vessels 6 and 6', the cooling (quenching) of the reaction vessels 6 and 6' is started, the temperature of the reaction vessels 6 and 6' is lowered to 320 to 380° C. to substantially terminate the reaction, and then, the pitch in the reaction vessels 6 and 6' is immediately transferred to the liquid pitch storage tank 10. The liquid pitch storage tank 10 has a stirrer and has also functions of receiving the pitch from the reaction vessels 6 and 6' alternately and mixing them uniformly. Further, the superheated steam is blown-in from the bottom of the tank, the temperature of pitch in the storage tank is retained at 300 to 370° C. to keep liquid state, and light distillate is stripped off from the pitch and then fed to the distillation tower 3 through the line 11. The pitch in the liquid pitch storage tank 10 is delivered to the product pitch storage facility 13 after being cooled and solidified in the pitch solidification facility 12.

The specific structural composition of the thermal cracking reaction vessel of the invention is illustrated below in detail. Though the reaction vessel 6 in FIG. 1 is only illustrated here, the composition of the reaction vessel 6 is same as that of the reaction vessel 6' and therefore the illustration of the reaction vessel 6 is also applicable to that of the reaction vessel 6'.

Figure 2:
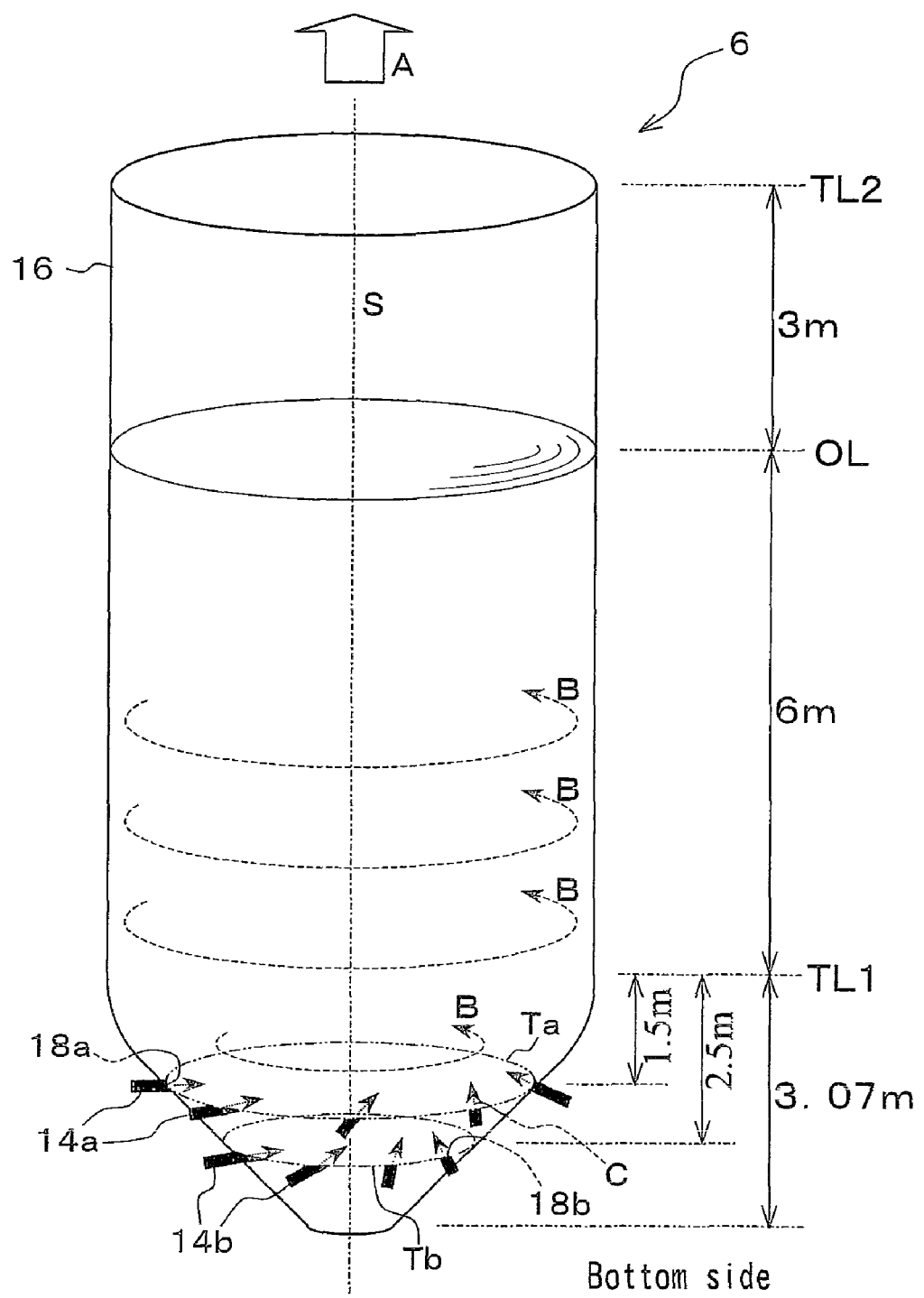
FIG. 2 is a schematic perspective view showing one exemplary mode of the thermal cracking reaction vessel provided for the process for thermally cracking heavy petroleum oil and the thermal cracking facility according to the present invention.

FIG. 2 is a schematic perspective view of an embodiment showing one exemplary mode of the thermal cracking reaction vessel provided for the thermal cracking process of heavy petroleum oil and the thermal cracking facility of the invention.

As shown in FIG. 2, the reaction vessel (thermal cracking reaction vessel) 6 comprises a main body portion (or a shell 16) having a vertical cylindrical shape and a bottom portion (or a tapered bottom) having a tapered shape (namely, the area from TL1 to TL2 as shown in FIG. 2 is the main body portion having an uniform inner diameter and the area under TL1 as shown in FIG. 2 is the bottom portion.) and is provided with blowing nozzles 14a and 14b that are opened to the inside of the reaction vessel 6 through the blowing orifices 18a and 18b connected to the bottom of the reaction vessel 6. As already described above, the superheated steam is blown-in from the blowing nozzles 14a and 14b under the conditions that the inside of the reaction vessel 6 (OL in FIG. 2 shows liquid level) is filled up with the heavy petroleum oil.

Further, the dimensions described in FIG. 2 show the real dimensions of the reaction vessel provided for examples described later. Further, the dotted line designated code S in the drawing represents the central axis S of the shell 16 of the reaction vessel 6 and the double dotted line designated codes Ta and Tb represent the respective levels at which the blowing orifices 18a and 18b are located in the reaction vessel 6. The planes including the respective double dotted lines are designated the plane Ta and the plane Tb respectively.

Figure 3:
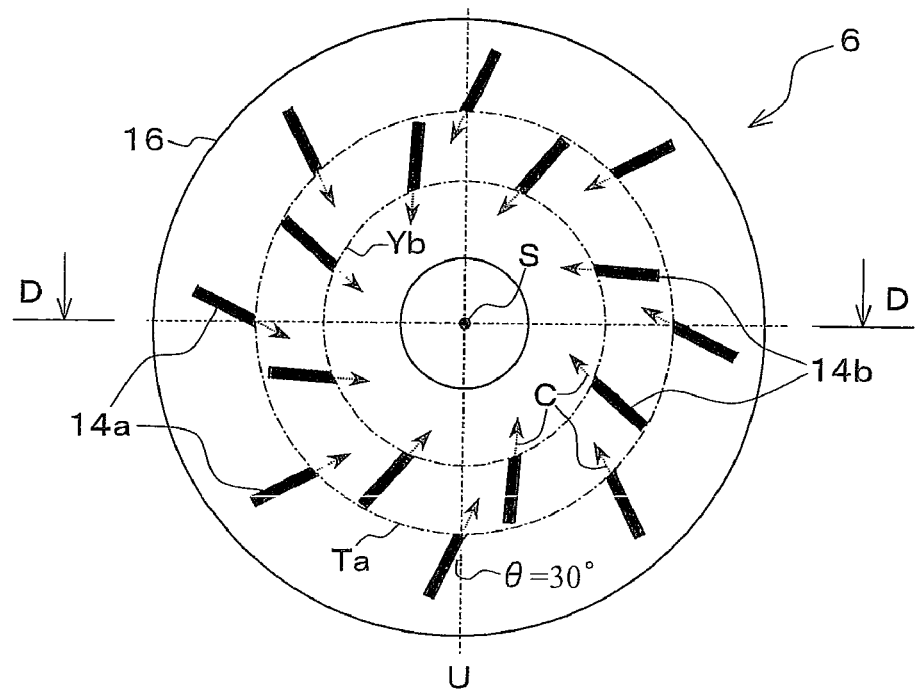
FIG. 3 is a bottom view of the thermal cracking reaction vessel shown in FIG. 2.

FIG. 3 shows the bottom view of the reaction vessel 6 shown in FIG. 2 (a plan view viewed from the bottom side). As shown in FIGS. 2 and 3, in this embodiment, the total of sixteen (16) blowing nozzles 14a and 14b are arranged in the tapered bottom of the reaction vessel 6 at two stages of different levels with eight (8) nozzles each. Further, the axes of all the blowing nozzles 14a and 14b are respectively the perpendicular lines of the central axis S, and an angle facing a line U (namely, the normal line to the outer wall of the shell 16 of the reaction vessel 6 in the planes Ta and Tb) passing the blowing orifice 18a or 18b is 30°. Setting the direction of the blowing nozzles 14a and 14b is carried out so that the superheated steam blown to the inside of the reaction vessel 6 is similarly directed to the direction in which the angle θ facing the line U is 30° (direction of an arrow C in FIGS. 2 and 3).

Figure 4:
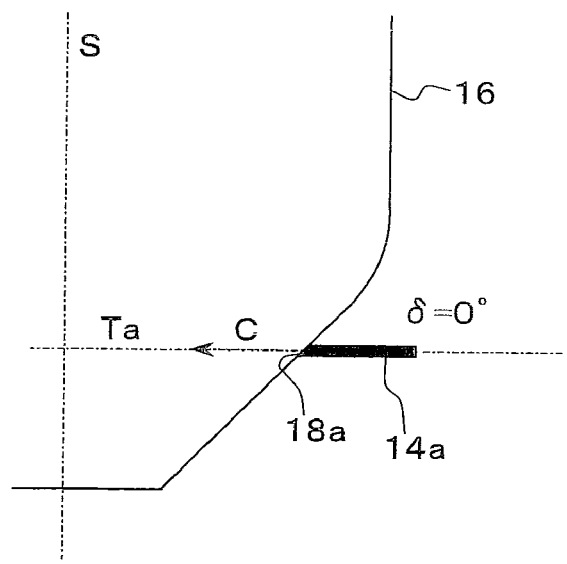
FIG. 4 is a sectional view looking from arrow D-D nearby the bottom portion of the thermal cracking reaction vessel shown in FIG. 3, but only one of blowing nozzles is represented for convenience of illustration and the illustration of the left half is also abbreviated.

FIG. 4 shows a D-D arrow sectional view nearby the bottom portion of the thermal cracking reaction vessel 6 shown in FIG. 3. However, since the purpose of FIG. 4 is to illustrate the direction of the blowing nozzles 14a and 14b, it represents only the blowing nozzle 14a, but the illustration of other blowing nozzles is abbreviated. Further, only the right half of the reaction vessel 6 is represented, but the left half is abbreviated by similar reason.

As shown in FIG. 4, the blowing nozzle 14a is directed to be perpendicular to the central axis S and parallel or slightly upward to the plane Ta including the blowing orifice 18a. In the present embodiment, an angle to set the blowing nozzle 14a to upward direction, namely, an angle δ at which the axis of the blowing nozzle 14a faces the plane Ta is 0° (parallel to the plane Ta). Further, the facing angle δ is same as 14a with respect to other blowing nozzles 14a and 14b. The superheated steam blown-in to the inside of the reaction vessel 6 is similarly directed to the direction in which the angle θ facing the planes Ta and Tb is 0° (direction of an arrow C in FIGS. 2 and 3), by setting the direction of the blowing nozzles 14a and 14b thus.

When the blowing of the superheated steam to the reaction vessel 6 is carried out thus, the rotational flow around the central axis S is generated to the direction of arrow B in the shell 16 of the reaction vessel 6. Since the superheated steam generates the rotational flow, the superheated steam is uniformly dispersed inside of the reaction vessel 6, cracked products are discharged rapidly, and the cracking reaction of heavy petroleum oil is promoted. Consequently, the suppression of coke adherence on the internal wall of the reaction vessel 6 and the outlet line of the reaction vessel 6 (the line 15 and distillation tower 3 in FIG. 1) is realized and plugging of pipelines is prevented, and simultaneously, pitch having more uniform and higher quality can be produced.

Figure 5:
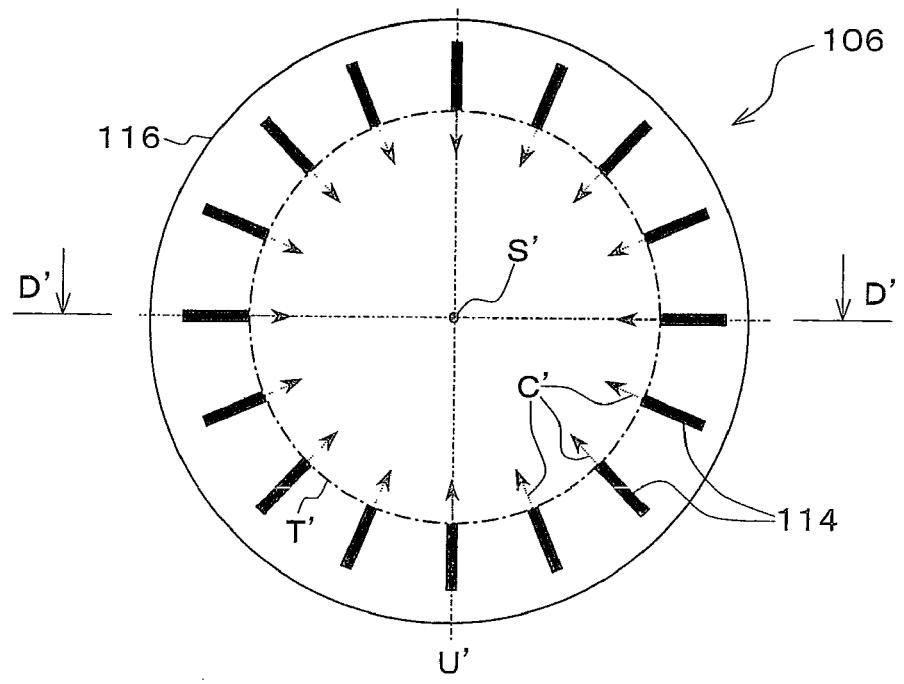
FIG. 5 is a bottom view of the thermal cracking reaction vessel shown in FIG. 14 that is provided for a conventional process for thermal cracking of heavy petroleum oil.
Figure 14:
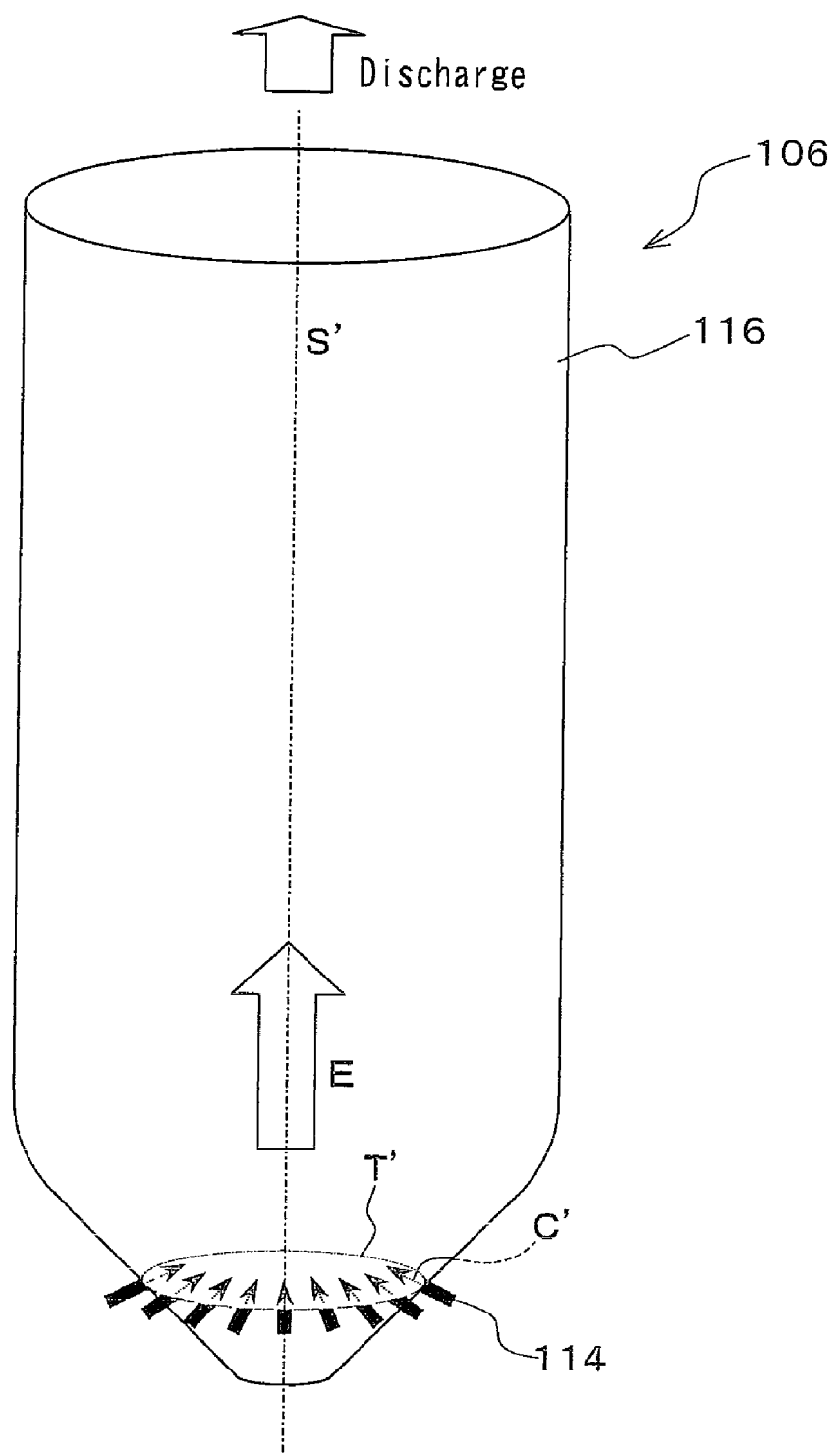
FIG. 14 is a schematic perspective view showing a reaction vessel provided for a conventional process for thermal cracking of heavy petroleum oil.

On the other hand, the blowing-into of the superheated steam is illustrated with respect to a reaction vessel 106 provided for a conventional thermal cracking process of heavy petroleum oil that is shown in FIG. 14. FIG. 5 shows the bottom view of the reaction vessel 106 shown in FIG. 14 (plan view viewed from the bottom side).

As shown in FIGS. 5 and 14, the sixteen blowing nozzles 114 are provided at the same level (1 stage) in the tapered bottom of the reaction vessel 6. Further, all of the blowing nozzles 114 are directed to the central axis S' respectively {in other word, an angle at which the axis of the blowing nozzles 114 faces a line U (namely, the normal line with respect to the outer wall of the shell 116 of the reaction vessel 106 in the plane T') that is the perpendicular line of the central axis S' and passes the blowing orifice of the blowing nozzles 114 (blowing orifices in the shell 116 of the reaction vessel 106 and hereinafter, the same) is 0°}. Since the direction of the blowing nozzles 114 is set thus, the superheated steam blown-in to the inside of the reaction vessel 106 from here is also similarly directed to the central axis S'.

Figure 6:
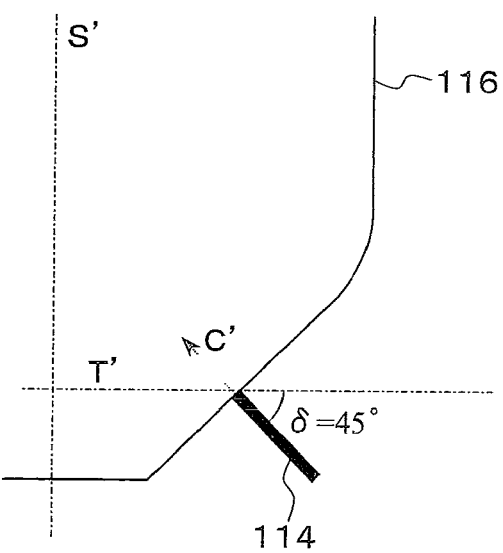
FIG. 6 is a sectional view looking from arrow D'-D' nearby the bottom portion of the thermal cracking reaction vessel shown in FIG. 5, but only one of blowing nozzles is represented for convenience of illustration and the illustration of the left half is also abbreviated.

FIG. 6 shows a D'-D' arrow sectional view nearby the tapered bottom of the reaction vessel 106 shown in FIG. 5. However, since the purpose of FIG. 6 is to illustrate the direction of the blowing nozzles 114, only one blowing nozzle 114 is represented, but the illustration of other blowing nozzles is abbreviated. Further, only the right half of the reaction vessel 106 is represented, but the left half is abbreviated by similar reason.

As shown in FIG. 6, the blowing nozzles 114 are directed to be perpendicular to the central axis S' and upward to the plane T' including the blowing orifice of the blowing nozzle 114. In the conventional embodiment, an angle directed upward of the blowing nozzle 114, namely the angle δ at which the plane Ta faces the blowing nozzle 114 is 45°. Further, the angle δ is also the same angle for all of other blowing nozzles 114 respectively. Since the direction of the blowing nozzles 114 is set thus, the superheated steam blown-in from here to the inside of the reaction vessel 106 is similarly directed to be a direction (direction of the arrow C' in FIGS. 14 and 6) in which the angle δ facing the plane T' is 45°.

When the blowing of the superheated steam into the reaction vessel 106 is directed slightly upward (direction of the arrow C') to the central axis S' of the shell 116 of the reaction vessel 106 as the conventional embodiment, the blowing force is bundled nearby the central axis S' and driving force is generated toward the direction E in FIG. 14. Accordingly, the behavior of the superheated steam tends to generate bias in the dispersion state that causes blow-through in the center of the reaction vessel 106 and also causes partially stagnant area of heavy petroleum oil inside the shell 116 of the reaction vessel 106. When bias is generated in the dispersion state of the superheated steam in the reaction vessel 106, it causes uneven mixing and delay of discharge of cracked products, and results in higher coking tendency as well as inferior quality of pitch due to the higher content of quinoline-insoluble component. Further, there is larger quantity of entrainment caused by blow-through, and coke adhesion on the internal wall of the cracked gas piping may induce plugging of pipelines in the downstream processing section of the reaction vessel.

However, in the invention, since the superheated steam is blown so as to generate the rotational flow in the shell 16 of the reaction vessel 6 as the embodiment illustrated in FIG. 2 to FIG. 4, stirring force is generated in the shell 16 of the reaction vessel 6 and the superheated steam is homogeneously dispersed inside the reaction vessel 6. Consequently, both of the rapid discharge of cracked products and the promotion of cracking of the heavy petroleum oil are attained, and also the suppression of coke adherence in the reaction vessel 6 and the cracked gas piping connected to the outlet of the reaction vessel 6 is realized, and consequently plugging of the piping can be prevented. In addition it enables to produce pitch of more uniform and higher quality.

Further, the direction (the same meaning as the "blowing direction of the superheated steam", and hereinafter, this matter is abbreviated) of the blowing nozzles 14a and 14b mentioned in the embodiment is persistently one of examples, and in the invention, when the superheated steam is under the conditions in which the rotational flow is generated around the central axis of the shell inside the reaction vessel, its angle for direction is not limited. Preferable conditions suitable to the specific case should be selected so as to realize the most appropriate rotational flow in the design stage of the facility.

Specifically, an angle θ at which the axis of the blowing nozzles 14a and 14b faces the line U in FIG. 3 may be within the range from 0° to 90° in order to slant the direction of the blowing nozzles 14a and 14b, but is preferably within the range of 20° to 60°, more preferably within the range of 25° to 50°.

When the facing angle θ is too small, the driving force to direct to generate the rotational flow by the blowing-into of the superheated steam is likely to be short. Therefore facing angle θ of too small is not preferable because appropriate rotational flow is hardly generated. Inversely, when the facing angle θ is too large, the superheated steam blown through the blowing nozzles 14a and 14b from the blowing orifices 18a and 18b interacts the inner wall of the reaction vessel 6, and occasionally comes into perfect collision with the wall and may cause erosion of the inner wall of the reaction vessel 6. By this reason too large facing angle θ is not preferable.

Further, an angle δ at which the axis of the blowing nozzle 14a faces the plane Ta in FIG. 4 may be 0° or more in order to direct the blowing nozzle 14a from parallel to slightly upward, preferably 30° or less, more preferably 15° or less.

When the facing angle δ is too large, only driving force upward direction by blowing-into of the superheated steam is strengthened, but the driving force to direct to generate the rotational flow by blowing-into of the superheated steam is relatively weakened. Therefore, too large facing angle δ is not preferable because the appropriate rotational flow of steam is hardly generated.

The process for thermal cracking of heavy petroleum oil and the thermal cracking reaction vessel, and the thermal cracking facility of the invention are illustrated with the above-mentioned preferable embodiments, but the invention is not limited to the compositions of the above-mentioned embodiments, but those skilled in the art can carry out various substitutions and modifications converting known technologies. For example, the number of the blowing nozzles in the above-mentioned embodiments is eight each at two different levels, i.e. total sixteen nozzles, but the number of the blowing nozzles is not limited to sixteen. Further, it is not limited to the two different levels where a certain number of blowing nozzles are provided, but only one or three and more levels does not cause any problem.

Of course, even if any substitutions and modifications are carried out, it belongs to the technical scope of the invention so far as it is equipped with the compositions of the invention.

EXAMPLE

In order to verify the actions and effects of the invention, the confirmation study of the effect of Example and Comparative Example was carried out by CFD simulation (simulation using CFX of ANSYS Inc. that is commercial software) as shown below. Of course, the invention is not limited by the content of the Example.

A reaction vessel having a shape and structure shown in FIG. 2 was used as the reaction vessel of the Example. On the other hand, a reaction vessel having a shape and structure shown in FIG. 14 was used as the reaction vessel of the Comparative Example.

Further, although there is no dimensional description of the reaction vessel of the Comparative Example in FIG. 14, its dimensions are same as those of the reaction vessel of the Example shown in FIG. 2 (in FIG. 2, OL indicates liquid level, TL1 indicates the lower end of the cylindrical shell and TL2 indicates the upper end of the cylindrical shell).

Further, other various conditions of dimensions not indicated in FIG. 2 are described below.

Inner diameter of the cylindrical shell: 5 m
Oblique angle of tapered bottom portion (angle facing the central axes S and S'): 45°
Temperature of superheated steam: 434° C.
Blowing pressure of superheated steam: 60 kPaG The arrangement of the blowing nozzles 14a and 14b of the reaction vessel of the Example was shown in FIGS. 3 and 4. More specifically, the heights of the blowing orifices 18a and 18b from TL1 was −1.5 m for the blowing orifice 18a and −2.5 m for the blowing orifice 18b.

On the other hand, the arrangement of the blowing nozzle 114 of the reaction vessel of the Comparative Example was shown in FIGS. 5 and 6. More specifically, the height of the blowing nozzle 114 from TL1 was −2.15 m.

Further, nozzles of 28.4 mm inside diameter were used as the blowing nozzles for both the Example and the Comparative Example.

Figure 7:
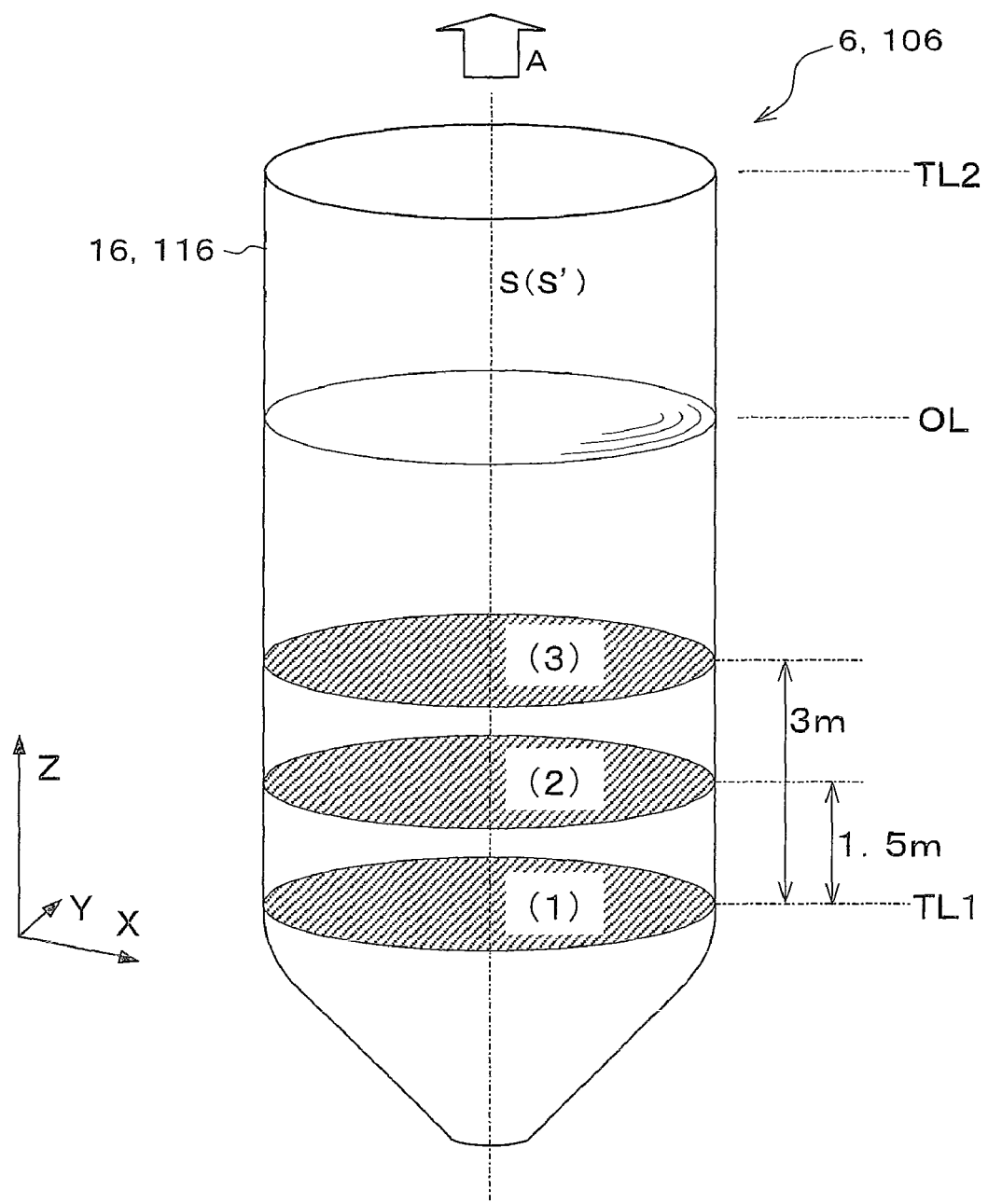
FIG. 7 is a schematic perspective view for illustrating the calculation site of the volume fraction of gas in the effect-confirmation study with respect to both of the thermal cracking reaction vessels of the example and a comparative example as shown in FIG. 14.

Thermal cracked products obtained by heating raw material oil (heavy petroleum oil) through the tubular cracking furnace 4 were fed into each of the reaction vessels of the Example and the Comparative Example as above-mentioned, and the superheated steam was blown-in under the above-mentioned predetermined conditions. The volume fraction (volume fraction: volume occupying proportion of gas) of gas at this time was calculated. Calculated points were three planes of the plane (1), the plane (2) and the plane (3). FIG. 7 is a schematic perspective view for illustrating the sites where the volume fractions of gas are calculated in the confirmation study of the effects with respect to the reaction vessels 6 and 106 of the Example and the Comparative Example.

More specifically, concerning the three planes of the plane (1), the plane (2) and the plane (3) an arbitrary straight line in which the intersection point with central axes S and S' at the point of origin was referred to the X axis, a straight line orthogonal to the X axis was referred to the Y axis and the volume fractions of gas on these X axis (X coordinate) and Y axis (Y coordinate) were calculated.

Figure 8:
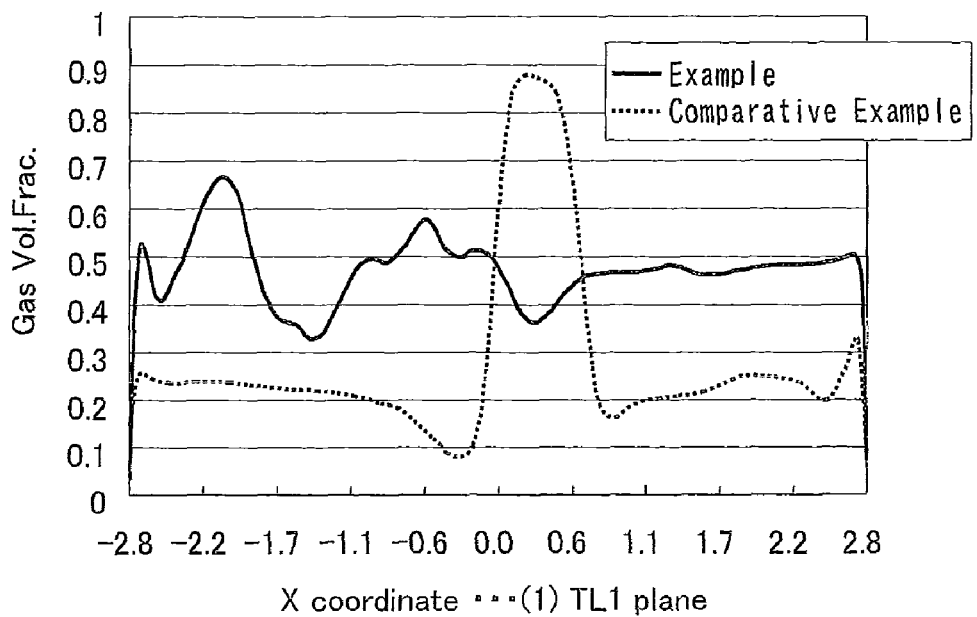
FIG. 8 is a graph showing the result of the effect-confirmation study with respect to the thermal cracking reaction vessels of the example and the comparative example, in which the calculation results of the X coordinate on (1) the plane TL1 are plotted.
Figure 9:
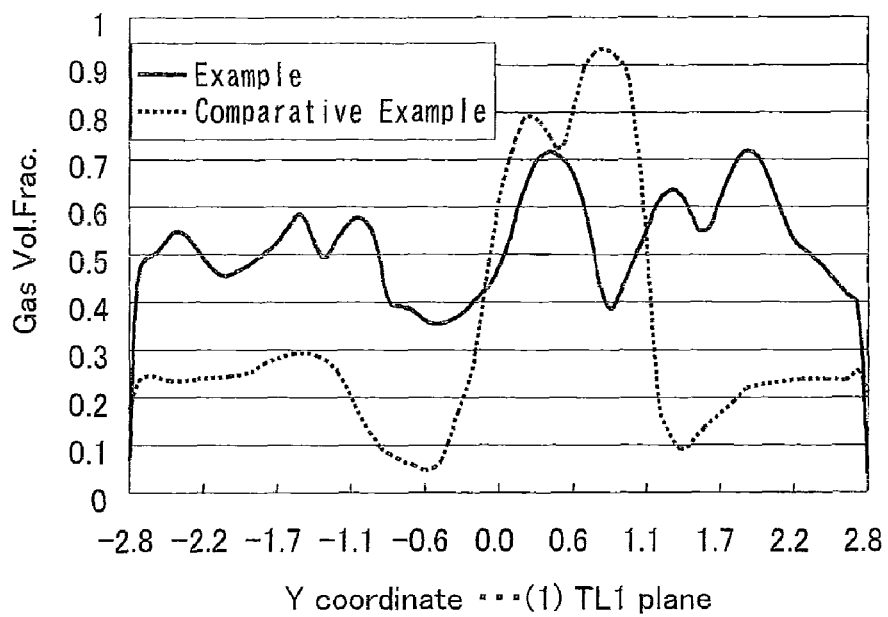
FIG. 9 is a graph showing the result of the effect-confirmation study with respect to the thermal cracking reaction vessels of the example and the comparative example, in which the calculation results of the Y coordinate on (1) the plane TL1 are plotted.
Figure 10:
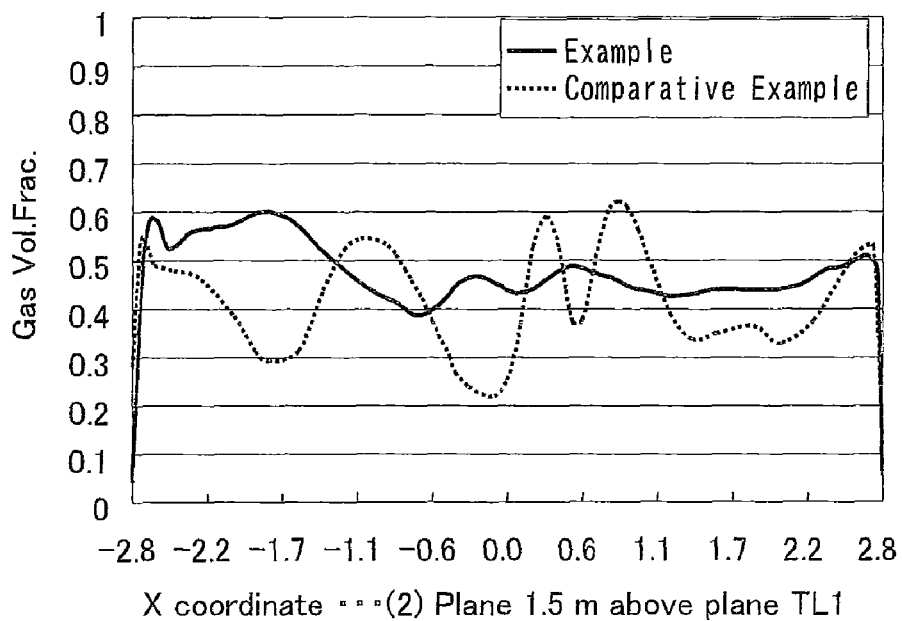
FIG. 10 is a graph showing the result of the effect-confirmation study with respect to the thermal cracking reaction vessels of the example and the comparative example, in which the calculation results of the X coordinate on (2) the plane 1.5 m above the plane TL1 are plotted.
Figure 11:
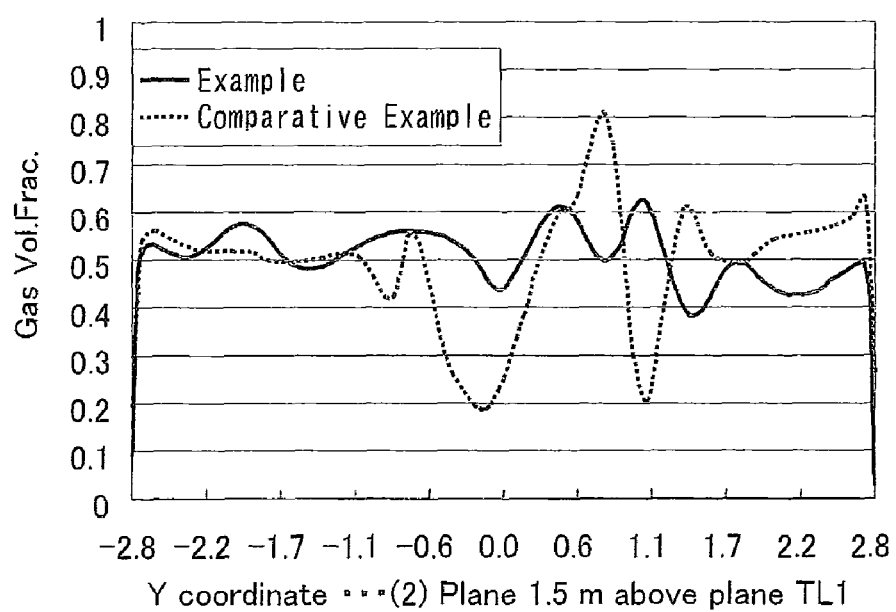
FIG. 11 is a graph showing the result of the effect-confirmation study with respect to the thermal cracking reaction vessels of the example and the comparative example, in which the calculation results of the Y coordinate on (2) the plane 1.5 m above the plane TL1 are plotted.
Figure 12:
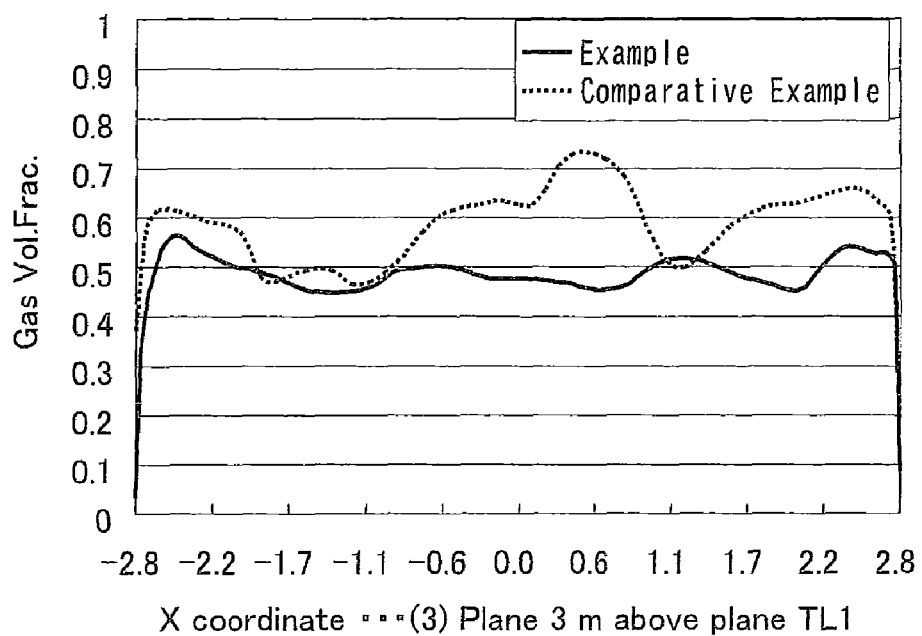
FIG. 12 is a graph showing the result of the effect-confirmation study with respect to the thermal cracking reaction vessels of the example and the comparative example, in which the calculation results of the X coordinate on (3) the plane 3 m above the plane TL1 are plotted.
Figure 13:
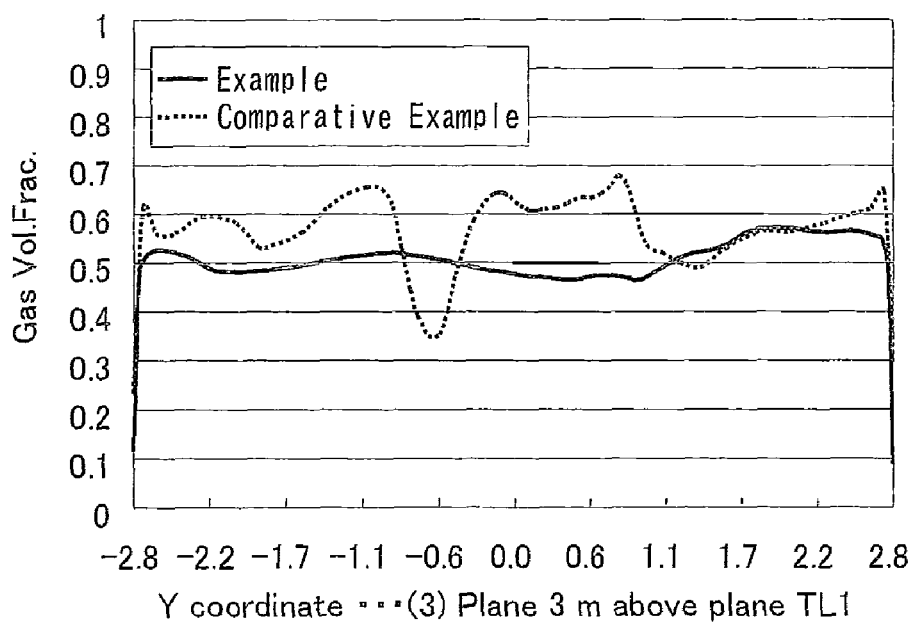
FIG. 13 is a graph showing the result of the effect-confirmation study with respect to the thermal cracking reaction vessels of the example and the comparative example, in which the calculation results of the Y coordinate on (3) the plane 3 m above the plane TL1 are plotted.

The calculation results of the dispersion state of the superheated steam inside the reaction vessels of the Example and the Comparative Example are shown in the graphs of FIG. 8 to FIG. 13. Specifically, the calculation result of X coordinate of the plane (1) (TL1 plane) is shown in FIG. 8 and the calculation result of Y coordinate is shown in FIG. 9, the calculation result of X coordinate of the plane (2) (plane 1.5 m above the TL1 plane) is shown in FIG. 10 and the calculation result of Y coordinate is shown in FIG. 11, and the calculation result of X coordinate of the plane (3) (plane 3.0 m above the TL1 plane) is shown in FIG. 12 and the calculation result of Y coordinate is shown in FIG. 13, respectively by graphs.

Further, in the respective graphs, the points of 0.0 of the X coordinate or Y coordinate is the point of origin (intersection point with the central axes S and S') and the numerical values of the X coordinate and Y coordinate show distances (unit: m) from the point of origin.

Further, the Table 1 below shows the calculation results of the volume fraction of gas at the centers (points of origin) in the three planes of the plane (1), the plane (2) and the plane (3), points of X axis direction+1 m from the center (X coordinate+1.0) and points of X axis direction+2 m from the center (X coordinate+2.0).

TABLE 1

| Position of Volume Fraction Calculation | | Distribution of Vol. Fraction Of gas | |
|---|---|---|---|
| Z axis direction | X axis direction | Comparative Example | Example |
| (1) TL1 plane | Center (point of origin) | 0.61 | 0.45 |
| | Point of X axis direction + 1 m from center (X coordinate + 1.0) | 0.20 | 0.47 |
| | Point of X axis direction + 2 m from center (X coordinate + 2.0) | 0.25 | 0.48 |
| (2) Plane 1.5 m above TL1 | Center (point of origin) | 0.25 | 0.43 |
| | Point of X axis direction + 1 m from center (X coordinate + 1.0) | 0.48 | 0.44 |
| | Point of X axis direction + 2 m from center (X coordinate + 2.0) | 0.33 | 0.44 |
| (3) Plane 3 m above TL1 | Center (point of origin) | 0.63 | 0.48 |
| | Point of X axis direction + 1 m from center (X coordinate + 1.0) | 0.56 | 0.51 |
| | Point of X axis direction + 2 m from center (X coordinate + 2.0) | 0.63 | 0.46 |

From the graphs shown in FIGS. 8 to 13 and the above-mentioned Table 1 it is found that gas is concentrated around the central axis S' of the reaction vessel 106 and the blow-through of gas occurs nearby the central area (void rate is high) in the Comparative Example. To the contrary, it is found that in the Example, the unevenness of the graph is remarkably reduced in comparison with the Comparative Example and gas is well diffused in the plane perpendicular to the central axis S.

From the results it is found that since the reaction vessel 6 of the Example provided with the composition specific to the invention in which the superheated steam is blown by rotational flow from a bottom portion, the blow-through of gas generated nearby the central portion in the reaction vessel 106 of the Comparative Example is not generated and the superheated steam is uniformly dispersed inside the reaction vessel 6. It is found that the rapid discharge of cracked products and the promotion of cracking process of the heavy petroleum oil are attained thereby, coke adherence and plugging in the reaction vessel 6, the outlet line of the reaction vessel 6 and the like are suppressed and pitch of more uniform and higher quality can be produced.

The invention claimed is:

1. A method for thermal cracking processing of heavy petroleum oil, comprising: blowing superheated steam of 400 to 700° C., from a bottom portion of a reaction vessel, into the heavy petroleum oil having been heated to 450° C. or higher in a heating furnace and thereafter introduced into the reaction vessel of which at least a shell has a cylindrical shape; bringing the superheated steam into direct contact with the heavy petroleum oil to be thermally cracked into an oil fraction and a pitch; and discharging the oil fraction successively from a top of the reaction vessel together with the superheated steam and removing the pitch from the reaction vessel collectively after the completion of the thermal cracking, wherein:

in blowing the superheated steam from the bottom portion of the reaction vessel, the blowing is carried out through one or two or more blowing orifices which are provided to the bottom portion of the reaction vessel and opened to the inside of the reaction vessel so that the superheated steam generates a rotational flow around the central axis of the shell inside of the reaction vessel; and the blowing of the superheated steam from the blowing orifices is directed so as to be parallel or upward against a plane which is perpendicular to the axis of the shell of the reaction vessel and includes the blowing orifices, and to have a facing angle θ between the blowing and the normal line on the plane to the outer wall of the reaction vessel of 20° or more and 60° or less.

2. A reaction vessel used in a method for thermal cracking processing of heavy petroleum oil including: blowing superheated steam of 400 to 700° C., from a bottom portion of the reaction vessel, into the heavy petroleum oil having been heated to 450° C. or higher in a heating furnace and thereafter introduced into the reaction vessel of which at least a shell has a cylindrical shape; bringing the superheated steam into direct contact with the heavy petroleum oil to be thermally cracked into an oil fraction and a pitch; and discharging the oil fraction successively from a top of the reaction vessel together with the superheated steam and removing the pitch from the reaction vessel collectively after the completion of the thermal cracking, comprising a steam-blowing means, by which, in blowing the superheated steam from the bottom portion of the reaction vessel, the blowing is carried out so that the superheated steam generates a rotational flow around the central axis of the shell inside of the reaction vessel, wherein:

the steam-blowing means comprises means for blowing the superheated steam into the reaction vessel from one or two or more tubular blowing nozzles which are provided to the bottom portion of the reaction vessel and are opened to the inside of the reaction vessel through blowing orifices; and the blowing nozzles are directed so as to be parallel or upward against a plane which is perpendicular to the axis of the shell of the reaction vessel and includes the blowing orifices, and to have a facing angle θ between the blowing and the normal line on the plane to the outer wall of the reaction vessel of 20° or more and 60° or less.

3. An apparatus for thermal cracking processing equipped with a heating furnace for heating heavy petroleum oil to a temperature of 450° C. or higher and a reaction vessel for blowing superheated steam of 400 to 700° C., from a bottom portion of the reaction vessel, into the heavy petroleum oil having been heated and thereafter introduced into the reaction vessel and bringing the superheated steam into direct contact with the heavy petroleum oil to be thermally cracked into an oil fraction and a pitch, wherein the reaction vessel comprises a reaction vessel for thermal cracking of heavy petroleum oil according to claim 2.

\* \* \* \* \*